UNITED STATES PATENT OFFICE.

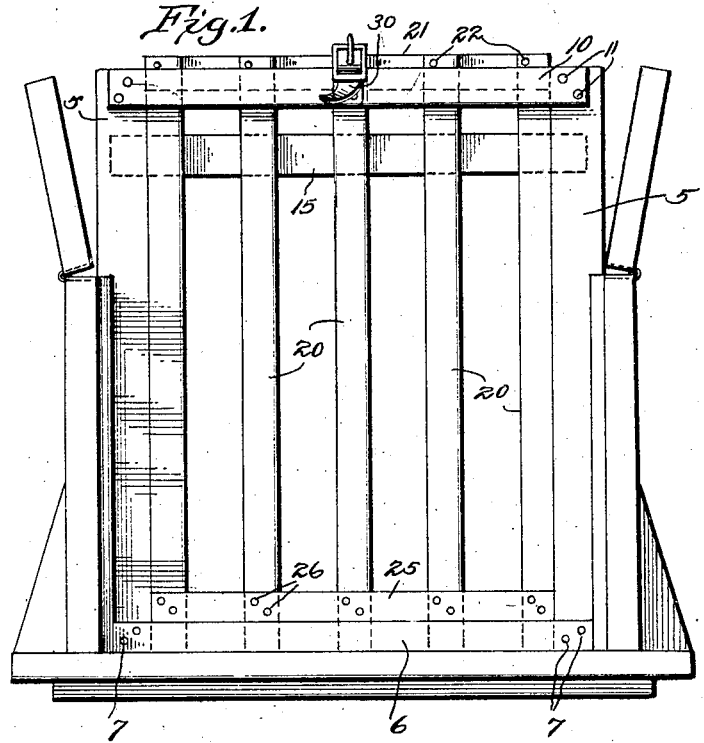
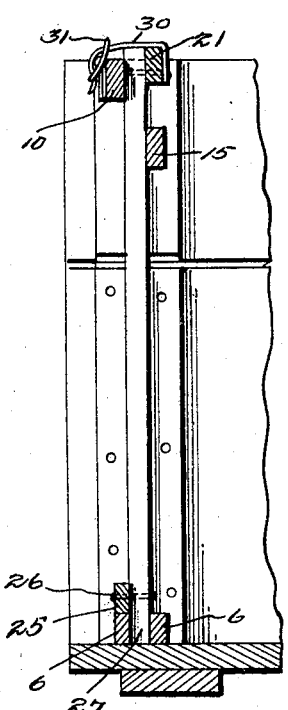
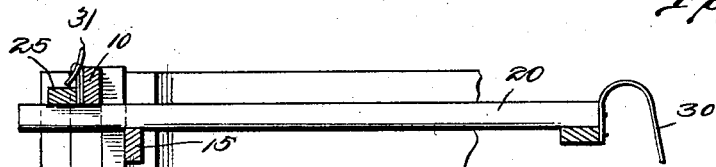

CARL WELLENDORF, OF IDA GROVE, IOWA.

END-GATE.

1,305,426.

Specification of Letters Patent.

Patented June 3, 1919.

Application filed May 7, 1917. Serial No. 166,983.

*To all whom it may concern:*

Be it known that I, CARL WELLENDORF, a citizen of the United States, residing at Ida Grove, in the county of Ida, State of Iowa, have invented certain new and useful Improvements in End-Gates; and I do hereby declare the following to be a full, clear, and exact description of the invention, such as will enable others skilled in the art to which it appertains to make and use the same.

This invention relates to new and useful improvements in end gates for wagons, and pertains more particularly to end gates for wagons particularly adapted for transporting live stock.

The main object of the invention is to provide a device of this character which may be easily operated to open and close the rear end of a wagon body for the purpose of loading and unloading stock, and which will at the same time be secured against accidental displacement when in the closed position.

A further object of the invention is to provide a device of this character particularly adapted for use in connection with wagons of the above described class already in use.

Referring to the drawings,

Figure 1, is a rear view of the rear end of a wagon with the device in its closed position, Fig. 2, is a vertical sectional view of the device in its closed position, and, Fig. 3, is a vertical sectional view of the device in its opened position.

Referring more particularly to the drawings, the device consists of a rectangular frame which comprises parallel side members 5, and to the opposite sides of said parallel members 5 at the bottom edge thereof are secured parallel spaced bars 6 which are secured in place by means of bolts or the like 7. These parallel spaced bars 6 are of a length substantially equal to the width of the wagon body, and are secured to the parallel side members 5 in such a manner that their free ends are slightly spaced from the outer edge thereof to provide for sliding movement of the rectangular frame between the cleats of the wagon body. Connecting the upper ends of the parallel members 5 is a transversely extending bar 10 which is secured to said members 5 by means of bolts 11, and on the opposite side of said members 5 is secured a transversely extending bar 15, said bar being fastened to the members 5 at a point spaced from the ends thereof for a purpose to be hereinafter described. Adapted for vertical movement within the rectangular frame is a grating or the like which consists of a plurality of vertically extending bars 20 which are secured in spaced relation at one end by means of a transversely extending bar 21, said bar being secured to the members 20 by means of bolts or the like 22. The vertically extending bars 20 are held in spaced relation at their other ends by means of a transversely extending bar 25 which is secured to the bars 20 by means of bolts 26, and this transversely extending bar 25 is spaced from the lower ends of the vertically extending bars 20 as shown at 27 to provide projections which are adapted to lie between the lower transversely extending bars 6—6 of the rectangular frame. As shown in Fig. 1, when the vertically movable grating is in the closed position, the same is secured by means of a strap or the like 30 which is connected to the grating and is adapted to engage a buckle 31 carried by the rectangular frame. When it is desired to load or unload the wagon, the strap is loosened and the grating is moved vertically until its lower transverse bar 25 engages the end face of the upper transverse bar 10 of the rectangular frame. If now the grating be permitted to fall to a horizontal plane, it will be seen that the members 20 thereof will rest on the transversely extending bar 15 of the rectangular frame, and will lie in engagement with the transversely extending bar 10 thereof thus supporting the grating in a horizontal plane and permitting the free passage of the animals through the rectangular frame to unload or load the wagon as the case may be. When it is desired to close the end gate, the grating is moved to the vertical position, in which position it is free to slide vertically of the frame until the transverse bar 25 of the grating engages one of the transverse bars 6 of the rectangular frame, in which position, the ends 27 of the members 20 will lie between the two transversely extending bars 6 of the rectangular frame.

From the foregoing it will be seen that the present invention provides an end gate for wagons which can be easily operated to

Having thus described the invention, what is claimed is:

An end gate for wagons comprising a rectangular frame including vertical side members, spaced bottom members secured against opposite faces of the side members and a top member secured against one side face of each side member, a supporting member secured to the opposite side faces of the side members from the top member parallel with the top member and in a horizontal plane below and spaced from the horizontal plane of the top member, a grating disposed for vertical movement between the side members and between the top and supporting members, said grating including vertical members having their lower ends engaged between the bottom members, an upper transverse bar secured to the upper ends of the members of the grating and a lower transverse bar secured to one face of the members of the grating above the lower ends thereof and resting upon one of the bottom members, said grating being vertically slidable to disengage the lower ends of its members from between the bottom members and being shiftable also into horizontal position to lie with its vertical members upon the supporting member and in engagement with the top member of the rectangular frame and with the bottom bar of the grating engaging the top member of the frame.

In testimony whereof, I affix my signature in the presence of two witnesses.

CARL WELLENDORF.

Witnesses:
 JOHN EHLER,
 H. A. KLOTZ.

Copies of this patent may be obtained for five cents each, by addressing the "Commissioner of Patents, Washington, D. C."